H. W. COLLENDER.
Billiard Cushion.

No. 8,133. Reissued March 19, 1878.

*Witnesses:*
E. Wolff.
Jacob Felbel

*Inventor:*
Hugh W. Collender
By his atty. J. Mac Intire

UNITED STATES PATENT OFFICE.

HUGH W. COLLENDER, OF NEW YORK, N. Y.

IMPROVEMENT IN BILLIARD-CUSHIONS.

Specification forming part of Letters Patent No. 19,074, dated January 12, 1858; Reissue No. 2,511, dated March 19, 1867; extended seven years from January 12, 1872; Reissue No. 8,133, dated March 19, 1878; application filed March 14, 1878.

DIVISION B.

*To all whom it may concern:*

Be it known that I, HUGH W. COLLENDER, of the city, county, and State of New York, have invented a new and useful Improvement in Billiard-Cushions; and I do hereby declare the following to be a full, clear, and exact description of the same, reference being had to the accompanying drawings, forming part of this specification, in which—

Figure 1:
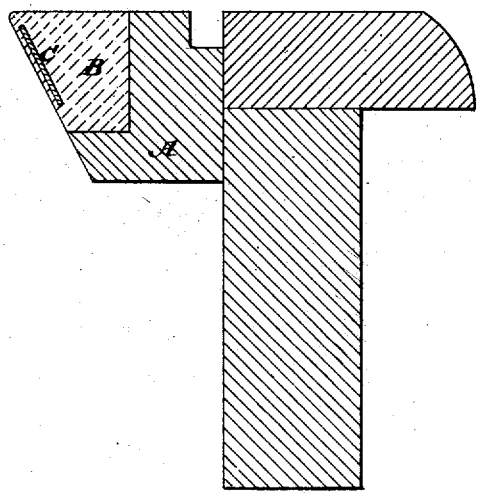
Figure 2:
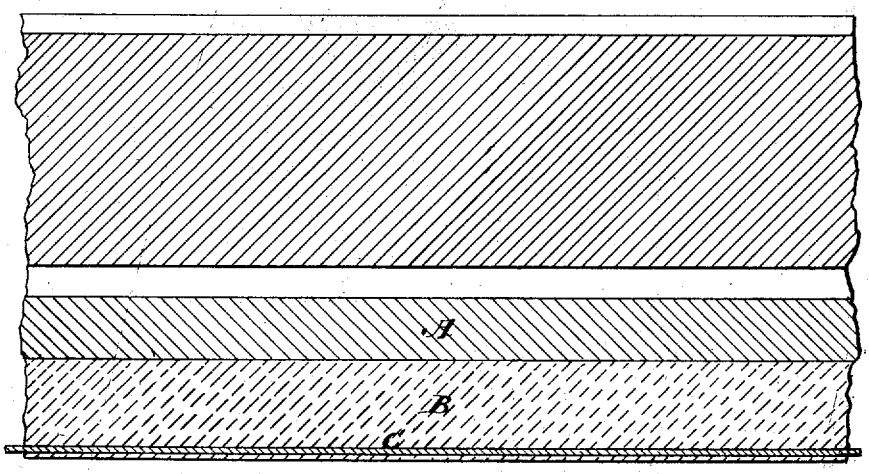

Figure 1 is a transverse section of a billiard-cushion involving my invention. Fig. 2 is a horizontal section of the same.

The same part will be found designated, in the several figures, by the same letter of reference.

In the construction or manufacture of billiard-cushions it has been customary to make the cushion of vulcanized india-rubber, and this material has for years superseded all others in the manufacture of cushion-strips for billiard-tables.

Soon after the introduction into use of vulcanized rubber in the manufacture of this article it was found necessary to combine with the rubber body a strip or facing of some harder and less elastic material to prevent the too deep indentation of the ball into the face of the cushion, and the consequent too great impairment of the angle of reflection; and prior to my invention billiard-table cushions have been made of vulcanized india-rubber, with a facing in front and between the india-rubber and the cloth covering, made of steel, whalebone, cork, and other materials flexible but much harder than the rubber body, so that while the ball in striking would not be permitted to embed itself in the cushion and thus destroy the correctness of the angles made, its force of impact would be dissipated through the medium of the elastic but harder facing-strip over a considerable extent of the surface of the softer rubber body in rear of the facing-strip, and it would be caused to rebound from the cushion not only at a more correct angle, but with more force than if impelled against the face of the soft-rubber body.

But in all cushions made prior to my invention involving the combination with the soft-rubber body of some sort of harder facing material, the face-hardening strip was either merely placed against the surface of the rubber body and held in place by the cloth covering of the cushion, or was held in place by some means of securement to the cushion-seat.

My invention has for its object the production of a rubber cushion with a hardened face, in which cushion the rubber body and face-hardening strip shall be united by the embedment of the latter in the material of the former, and without either securing the face-hardening strip to the cushion-seat or employing the covering-cloth or any other auxiliary to effect the retention together in a proper manner of the two elements composing the cushion; and to this end and object my invention consists in a billiard-cushion composed of a rubber body and a face-hardening strip of steel or other suitably hard and elastic material, the face-hardening strip being seated in a cavity molded in the cushion for its reception and retention, as hereinafter more fully described.

To enable others skilled in the art to make and use my invention, I will proceed to describe the construction and operation of a cushion embracing it.

In the drawing, A, Figs. 1 and 2, represents the cushion-seat of a billiard-table of usual construction; B, the elastic block or strip of rubber forming the body or back of the cushion. C is a steel strip, having the rubber molded around it by placing the steel strip in the mold in which the rubber is vulcanized, which method of manufacture will be found fully described in another application for Letters Patent filed simultaneously with this, and which, therefore, need not be further explained herein.

It is desirable, when the cushion is thus constructed, that the rubber which covers the face of the steel strip should be nearly transparent, or so thin that the ball shall not have a chance to embed itself to an extent which will prevent its performing properly correct angles to fulfill the requirements of the game.

By my invention the use of cement, nails, hinges, &c., for the securement of the face-hardening strip is made unnecessary, and no cloth covering to retain the comparatively hard substance in proper relative position to the softer rubber body is needed.

It also enables me to produce a cushion in which is overcome or avoided the disagreeable bang heard when the ball comes in contact with a face-hardening strip fastened by securing devices at either its lower or upper edge.

It likewise enables me, without trouble of cementing, to face the front of the steel or other equivalent substance with a thin facing of india-rubber, which will deaden the sound of the steel strip and "gripe" the ball sufficiently to give greater effect to "twisting shots," and at the same time prevent the ball sliding off at an imperfect angle instead of a proper one when played against the cushion at a very acute angle.

Besides all the advantages ascribed to the cushion in use and effect, my improved cushion may be made with less trouble and expense, since the harder and softer substances may be adjusted and united with greater convenience as well as accuracy.

I do not make any claim in this application to the manner described of uniting the parts—*i. e.*, by putting them together in the mold and then vulcanizing the rubber—as this constitutes the subject-matter of a separate claim by me in another case to an improvement in the art of making cushions.

Neither do I claim a cushion having a rubber body and a steel or other hard facing combined in any of the previously-known ways; but

What I claim as my invention, and desire to secure by Letters Patent, is—

A billiard-cushion composed of a rubber body and a face-hardening strip, the latter being arranged and held in a cavity molded in the former, substantially as set forth.

H. W. COLLENDER.

Witnesses:
J. N. McINTIRE,
JACOB FELBEL.